US006610771B1

(12) United States Patent
Hoyes et al.

(10) Patent No.: US 6,610,771 B1
(45) Date of Patent: Aug. 26, 2003

(54) GASKETS

(75) Inventors: John R. Hoyes, Lancashire (GB); Alan W. Atkinson, Warwickshire (GB); Stephen P. Bond, Warwickshire (GB); Adam M. West, Warwickshire (GB)

(73) Assignee: Flexitallic Investments, Inc., Houston, TX (US)

( * ) Notice: Subject to any disclaimer, the term of this patent is extended or adjusted under 35 U.S.C. 154(b) by 0 days.

(21) Appl. No.: 09/424,123

(22) PCT Filed: May 6, 1998

(86) PCT No.: PCT/GB98/01309

§ 371 (c)(1),
(2), (4) Date: Jan. 6, 2000

(87) PCT Pub. No.: WO98/53022

PCT Pub. Date: Nov. 26, 1998

(30) Foreign Application Priority Data

| May 21, 1997 | (GB) | ............................................... 9710298 |
| May 21, 1997 | (GB) | ............................................... 9710305 |
| Jun. 12, 1997 | (GB) | ............................................... 9712117 |

(51) Int. Cl.[7] ............................................... C08K 3/34
(52) U.S. Cl. ........................ 524/445; 524/442; 524/444
(58) Field of Search ................. 524/442, 444, 524/445, 446

(56) References Cited

U.S. PATENT DOCUMENTS

| 4,762,641 A | 8/1988 | Denton et al. .......... 252/378 R |
| 4,915,871 A | 4/1990 | Atkinson et al. ....... 252/378 R |
| 4,929,429 A | 5/1990 | Merry .......................... 422/179 |
| 5,028,397 A | 7/1991 | Merry .......................... 422/179 |
| 5,437,767 A | 8/1995 | Halout et al. ................ 162/145 |
| 5,536,565 A | * | 7/1996 | Halout et al. ................ 428/283 |

FOREIGN PATENT DOCUMENTS

| GB | 2122699 A | 1/1984 |
| GB | 2123034 A | 1/1984 |
| GB | 2236756 A | 4/1991 |

* cited by examiner

Primary Examiner—Edward J. Cain
(74) Attorney, Agent, or Firm—John W. Montgomery; Haynes and Boone

(57) ABSTRACT

A gasket is described. The gasket comprises a sealing layer and a support layer. The sealing layer is formed from a resilient material which comprises a CEV component in a proportion of at least 25% w/w of the sealing layer. The CEV component is at least partially derived from dry CEV. A hydrolysis resistant polymer to improve the water resistance of the sealing layer is also provided in the proportion of less than 20% w/w of the sealing layer. Generally, the level of CEV falls within the range 25–80% w/w of the sealing layer. A method of producing a gasket is also described. The method involves applying a wet sealing layer dough to a support material, and drying the wet sealing layer dough on the support material. The solids content of the wet sealing layer dough prior to the drying step is in the range 30–80% w/w of the dough material.

30 Claims, No Drawings

GASKETS

The present invention is concerned with gaskets, in particular with gaskets having a sealing layer with enhanced properties which is based upon chemically exfoliated vermiculite.

Exfoliated vermiculite is a known heat-resistant resilient material. Exfoliated vermiculite is conventionally formed by expanding mineral vermiculite using gas, this material being referred to herein as "gas-exfoliated vermiculite". The gas may be thermally generated, in which case the product is called "thermally-exfoliated vermiculite" (TEV). TEV may be made by flash-heating mineral vermiculite to 750–1000° C., at which temperature the water (free and combined) in the ore vaporises rapidly and the steam generated forces apart the silicate sheets which form the raw material, so bringing about an expansion of 10–20 times perpendicular to the plane of the sheet. The granules formed have a chemical composition which (apart from the loss of water) is virtually identical to that of the raw material. Gas-exfoliated vermiculite may also be made by treating raw vermiculite with a liquid chemical, eg hydrogen peroxide, that penetrates between the silicate sheets and subsequently evolves a gas, eg oxygen, to bring about exfoliation.

A different form of exfoliated vermiculite is known as "chemically-exfoliated vermiculite" (CEV) and is formed by treating the ore and swelling it in water. In one possible preparation method, the ore is treated with saturated sodium chloride solution to exchange magnesium ions for sodium ions, and then with n-butyl ammonium chloride to replace sodium ions with n—$C_4$—$H_9NH_3$ ions. On washing with water swelling takes place. The swollen material is then subjected to high shear to produce an aqueous suspension of very fine (diameter below 50 $\mu$m) vermiculite particles.

It is known to utilise exfoliated vermiculite as a layer of a sheet gasket, eg an automotive head gasket, and for other purposes. For example, GB 2 193 953 B discloses forming sheet-like gaskets formed from particles of gas-exfoliated vermiculite. Because such particles do not cohere well, they are bound together by fine particles of CEV. The use of CEV as a binder retains heat resistance and resilience, whereas the use of other inorganic binders could result in an incompressible structure. However, although exfoliated vermiculite has excellent heat resistance and a high degree of resilience, it has poor water resistance. Furthermore, such products were manufactured using CEV with a high water content at low solids content and considerable drying problems are encountered during production due to the tendency of CEV containing materials to form a surface which prevents the further escape of moisture.

GB 2 123 034 B describes making a flexible sheet material, eg for a gasket, by subjecting an aqueous suspension to electrophoresis. The suspension contains an expanded layer silicate, eg CEV with a particle size below 50 $\mu$m, and a dispersed organic polymeric material, eg acrylic polymer, acrylonitrile-butadiene copolymer, epoxy resin, or natural rubber. However, high levels of polymer are disclosed to effect sufficient hydrolysis resistance and such levels of polymer give gasketing problems due to a loss of stress retention and gasket creep in use.

A sealing element for a gasket for the exhaust system of an internal combustion engine is disclosed in GB 2 217 742 A. This sealing element comprises relatively coarse particles of TEV (passing a 2 mm sieve) bonded together by fine CEV particles (about 100 $\mu$m in size). This element is stated to disintegrate quickly if exposed to water as the fine CEV particles are readily dispersed in water. In order to improve water-resistance, GB 2 217 742 A proposes bringing the element into contact with a solution of an aluminate or a zirconyl salt. Further improvement is achieved by treatment with a solution of a silicone elastomer. An example is given of impregnation of a sheet (which had already been treated with sodium aluminate) by a 15% solution of silicone elastomer is toluene, the solids uptake being 3% by weight. However, the product components suffer from a low solids content which result in gasketing materials which are difficult to dry. Furthermore, the strength of the components is insufficient for some applications both in terms of processing and water resistance. Numerous attempts have been made to solve this problem.

GB 2122699A discloses the use of electrophoresis to remove water from the product during production but it is noted that in examples 1 and 2 pure vermiculite is deposited on a metal plate but such products were not boiling water resistant.

U.S. Pat. No. 4,677,551 (Hercules) is directed to ionic bonding using onium ions of CEV. It describes mixing CEV with polymers and indicates that large quantities of organic materials are necessary to introduce sufficient binding properties into the CEV and that such large quantities are unsatisfactory. The document is directed to improving the binding properties using the onium ions.

U.S. Pat. No. 4,762,643 (Armstrong) is directed to improving the properties of CEV by further treatment using guanidine. In addition, the guanidine derived product is further strengthened using fibres. Example 12 of the said document discloses a high level of latex (42%) in order to impart sufficient binding properties of the CEV. Such high levels of latex cause a loss in stress retention and high creep in the final product. Such properties are generally unacceptable in gaskets.

U.S. Pat. No. 4,655,482 is directed to improving the properties of vermiculite dispersions by the use of citrate anions. The citrate anions function as swelling agents for the vermiculite and enhance the rate and extent of swelling to an aqueous medium. The swollen vermiculite is usually delaminated by shearing to provide the inventive dispersions, which comprise a suspension of the delaminated platelets and citrate anions.

It is an object of the present invention to provide a gasket comprising a sealing layer with improved water resistance. It is a further object of the present invention to provide a gasket with a sealing layer with reduced loss in stress retention and low creep.

According to a first aspect of the present invention there is provided a gasket comprising a sealing layer and a support layer, the sealing layer being formed from a resilient material which comprises a CEV component in a proportion of at least 25% w/w of the sealing layer, the said CEV component being at least partially derived from dry CEV, and a hydrolysis resistant polymer to improve the water resistance of said sealing layer wherein the proportion of the said polymer does not exceed 20% w/w of the sealing layer.

For the avoidance of doubt, a gasket of the present invention may provide conventional sealing between static parts and sealing between moving parts such as valves where sealing is only required intermittently. An example of the latter would be valve stem sealing.

Preferably, the proportion of CEV is at least 25% w/w of the sealing layer, more preferably at least 35% w/w of the sealing layer.

Typically, the level of CEV falls within the range 25–80% w/w of the sealing layer, more typically, 30–75% w/w of the sealing layer, most typically 35–70% w/w of the sealing layer.

Preferably, the proportion of the said polymer is less than 15% w/w of the sealing layer, more preferably, less than 10% w/w. Especially preferred is a level of polymer less than 7.5% w/w, more especially preferred is a level of polymer in the range 2.0–7.5% w/w of the sealing layer.

The known prior art products contain high levels of hydrolysis resistant polymer as, hitherto, such high levels were required in order to provide the level of hydrolysis resistance required. Unfortunately, such levels of polymer resulted in a loss of stress retention and unsatisfactory levels of creep, in use. By the use of dry CEV particles in the wet dough composition, it has been surprisingly discovered that much lower levels of hydrolysis resistant polymer can be utilised whilst still providing the necessary levels of hydrolysis resistance. Such low levels of hydrolysis resistant polymer cause an increase in stress retention and reduce the levels of creep in the gasket, in use.

Advantageously, the invention uses higher levels of CEV than had hitherto been thought possible without encountering drying problems during production. Low levels of CEV have been preferred due to these drying problems associated with known relatively high water content CEV materials. Furthermore, CEV containing materials tend to 'skin' easily during the drying process ie the surface layer dries to form a skin which hinders the escape of further moisture from within the bed of the sealing layer.

Accordingly, preferably, the chemically exfoliated vermiculite component of the present invention includes sufficient dry CEV, to provide a wet sealing layer dough with a reduced water content which is capable of being dried before substantial skinning has occurred.

The term hydrolysis resistant polymer includes any suitable elastomer such as silicon and carbon based elastomeric polymers. Suitable polymers for use with the present invention include:

nitrile butadiene rubbers, styrene butadiene rubbers, natural rubber, butyl rubber, siloxanes (particularly organosiloxanes such as dialkyl siloxanes) and ethylene-propyldiene monomer. Diene-based polymers are suitable because they are flexible and hydrolysis-resistant.

The support layer may be made of any suitable support material onto which the sealing layer may be coated or otherwise deposited to form the gasket. Suitable support layer materials include stainless steel and carbon steel which may both be in the form of solid metal cores or thin sheets. The solid metal cores may be suitably profiled or machined to receive the sealing layer. The thin sheets may be in the form of solid sheets, tanged sheet or perforated sheet. Tanged sheet is especially preferred. Other suitable support materials include:

wire mesh, such as expanded metal and woven gauze; fibre mesh, such as glass fiber mesh; cloth; or a non woven material, such as tissue.

In the case of leakable materials such as fibre mesh, cloth or tissue, it is particularly advantageous to add the sealing layer in two stages. Firstly, a high solids content filler body is added to the support material. The filler body is designed to fill the interstices of the support material and is, preferably, a high CEV content filler material. A typical filler for such purposes may contain more than 50% CEV, (preferably comprising slurry CEV and PCEV), preferably more than 75% CEV, most preferably more than 95% CEV as the filler material. After drying of the first sealing layer, a second sealing layer is added in accordance with the composition of the first aspect of the invention. The second layer is subsequently dried and, if necessary, the process repeated on the reverse side of the support material.

The sealing layer may be mechanically bonded to the support layer, eg by tangs projecting from the support layer into the sealing layer.

The sealing layer of the gasket of the present invention is substantially water resistant. Preferably, the sealing layer is water resistant to the extent that it can withstand submersion in boiling water for a period in excess of 2 hours, more preferably, in excess of 5 hours, most preferably, in excess of 7 hours. Preferably, the product is substantially ambient water resistant, where ambient water resistance may be taken to mean a sealing layer which can withstand submersion in ambient water with or without agitation of the sealing layer for a period in excess of 20 hours, more preferably 20 days, most preferably 200 days.

According to a second aspect of the present invention there is provided a method of producing a gasket in accordance with the first aspect of the invention involving the steps of:

(a) the application of a wet sealing layer dough to a support material, and (b) drying the said wet sealing layer dough on the support material.

wherein the solids content of the wet sealing layer dough prior to the drying step is in the range 30–80% w/w of the dough material.

Preferably, the solids content of the said dough is in the range 35–70% w/w of the wet dough material, more preferably, 40–65% w/w of the wet dough material, most preferably, 45–60% w/w of the wet dough material.

Preferably, in accordance with any aspect of the present invention the CEV is mixed with a suitable filling agent such as thermally exfoliated vermiculite (TEV). Preferably, the filling agent comprises less than 75% w/w of the sealing layer, more preferably, less than 70% w/w, most preferably, less than 65% w/w of the sealing layer. In many cases the TEV content in the dough is less than 55% w/w. Preferably, the filling agent is a plate-like filler.

Preferably, a wet sealing layer dough in accordance with the present invention may be dried within 4.0 hours/side/mm dry thickness, more preferably, 3.0 hours/side/mm dry thickness, most preferably, 2.5 hours/side/mm dry thickness.

A dough in accordance with the present invention may be dried between 80–135° C., more preferably, 100–130° C., most preferably, 115–125° C.

Preferably, the relative ratio of non-dry derived CEV to dry CEV in the dried sealing layer component is between 0.01:1 and 20:1, more preferably between 0.05:1 and 10:1, most preferably between 0.1:1 and 4:1.

Since CEV is a relatively expensive material compared with gas-exfoliated vermiculite, eg TEV, in a gasket according to the invention, the resilient layer may also comprise particles of gas-exfoliated vermiculite, eg the layer may comprise particles of gas-exfoliated vermiculate bonded with the particles of CEV. The gas-exfoliated vermiculite may be milled to a particle size of less than 50 $\mu$m. Other possible additives include talc, mica and unexfoliated vermiculite.

By dry CEV is meant CEV having a moisture content of less than 20% w/w, more preferably, less than 10% w/w, most preferably, less than 5% w/w.

Preferably, the CEV component in the wet dough comprises a mixture of dried CEV and CEV in a slurry form. However, it is necessary to use sufficient dried CEV to give an acceptable solids content. A high solids content in the wet dough assists reduction in skinning in the subsequent drying process.

Preferably, the dry CEV is prepared by a suitable drying technique. Suitable drying techniques include:

cake drying and pulverising;
film drying and pulverising;
rotary hot air drying;
spray drying;
freeze drying;
pneumatic drying;
fluidised bed drying of partially dried solid; and
vacuum methods including vacuum shelf drying.

Preferably, any of the features or any preferred features of any aspect of the present invention may be combined with the first aspect of the reference to the first aspect in the method of the second aspect should be interpreted accordingly.

Preferably, the hydrolysis resistant polymer is coupled to the vermiculite by coupling agent.

Thus, according to a third aspect of the present invention there is provide a gasket comprising a sealing layer formed from a resilient material which comprises particles of chemically exfoliated vermiculite bonded together, wherein in the layer also comprises a hydrolysis-resistant polymer coupled to the vermiculite by a coupling agent.

In a gasket according to this aspect of the invention, it is found that the layer is more water resistant than a material containing only vermiculite and a coupling agent and also more water resistant than a material containing only vermiculite and a polymer. Preferably, the sealing layer of the third aspect is in accordance with any of the aspects of the present invention. Accordingly, any of the preferred features of any aspect of the present invention defined herein may be combined with the third aspect of the present invention.

The coupling agent may be a silane, eg a vinyl functional silane such as triethoxy vinyl silane $(CH_3CH_2O)_3SiCH=CH_2$.

Spirally wound gaskets are well-known and are formed from a metal supporting strip, conventionally of steel, and a sealing strip formed from a resilient material, conventionally expanded graphite (also called exfoliated graphite). In the formation of conventional spirally wound gaskets, the steel supporting strip is fed onto a mandrel. The steel supporting strip is welded either to itself to form a closed loop around the mandrel or, alternatively, is welded to an inner ring of the gasket which is itself mounted on the mandrel. The mandrel is then rotated to draw further supporting strip on to the mandrel to form a planar spiral. Simultaneously, the sealing strip is drawn between the coils of the steel strip so that a spiral of the sealing strip is formed interposed between the coils of the supporting strip. When the gasket spiral has been completed, the steel supporting strip is welded to itself to form a closed loop at the outside of the gasket and the gasket is removed from the mandrel. Such gaskets are utilised, for example, for forming seals between flanges at the ends of pipes. The supporting strip holds the sealing strip in position and the sealing strip forms a seal between the flanges and between the coils of the supporting strip.

It should be clear, from the above description of how spirally wound gaskets are formed that, the sealing strip thereof must have sufficient strength and flexibility to enable it to be drawn into the spiral and formed into a gasket without breakage. A sealing strip formed from expanded graphite foil, although relatively brittle, does have sufficient strength.

In many cases, it is desirable for a spirally wound gasket to have a high degree of heat resistance but, in a conventional gasket, the heat resistance is limited by that of the expanded graphite which is lower than is desirable.

As discussed above, although exfoliated vermiculite has excellent heat resistance and a high degree of resilience, strips formed from exfoliated vermiculite bound with CEV are not suitable for use in spirally wound gaskets because such strips are inherently too brittle to allow formation of the gasket, by the method described above, without serious risk of breakage of the strip.

It is a further object of the present invention to provide a spirally wound gasket in which the sealing strip has increased heat resistance.

According to a fourth aspect, the invention provides a gasket comprising a sealing strip wound into a spiral, wherein the sealing strip comprises a resilient layer comprising particles of chemically-exfoliated vermiculite, and a flexible carrier strip to which said layer is bonded.

In a gasket according to the invention, the resilient layer is bonded to the carrier strip, so that, during winding of the gasket, the strength of the strip prevents breakage of the resilient material. This enables a gasket with increased heat resistance to be formed.

Preferably, the sealing strip of the fourth aspect of the invention may be in accordance with any of the aspects of the sealing layer invention defined herein or any of the preferred features thereof.

The resilient layer may also comprise particles of gas-exfoliated vermiculite, eg the layer may comprise particles of gas-exfoliated vermiculite bonded together by particles of CEV. The particles of gas-exfoliated vermiculite may be milled to a diameter of 50 $\mu$m or less. It is also possible for the resilient layer to comprise unexfoliated (intumescent) vermiculite which can, on heating of the gasket, eg in situ, form TEV to swell the resilient layer and, thus improve sealing.

In order to improve the water-resistance of the gasket, the resilient layer may also comprise a hydrolysis-resistant polymer coupled to the vermiculite. Suitable polymers have been defined with respect to the first aspect of the invention above. Suitable agents for coupling the polymer to the vermiculite are silanes, eg vinyl functional silanes, such as triethoxy vinyl silane $(CH_3CH_2O)_3SiCH=CH_2$.

Said resilient layer and a further resilient layer may be bonded to opposite sides of the carrier strip. This improves sealing by providing seals on both sides of the carrier strip. However, coating on one side only is also possible where the carrier strip is also the supporting strip as the carrier strip is effectively provided with a sealing layer on both sides due to the spiralling of the carrier strip.

The resilient layer may be bonded to the carrier strip by adhesive but it may be advantageous if it is mechanically bonded.

The carrier strip may be made of fabric, paper, glass tissue or plastics material but, for high temperature applications, it is preferred if it is made of metal. Where the gasket also comprises a separate supporting strip so that the carrier strip functions only to enable formation of the gasket without breakage of the resilient layer, the carrier strip is, preferably, a thin metal foil, eg of aluminum, nickel or steel. However, it is also possible for the carrier strip to function also as the supporting strip of the gasket, being made of, eg, stainless steel. The resilient layer may be mechanically bonded to a metal carrier strip by tangs projecting from the carrier strip into the resilient layer. For example, a strip of tanged metal and a layer of the resilient material may be passed between rollers to press the tangs into the resilient material.

Preferably, a metal carrier strip has end portions which are not bonded to the resilient layer so that these end portions can be welded in the formation of the gasket.

It is a still further object of the present invention to provide a gasket comprising a layer of sealing enhancing material which is based on exfoliated vermiculite, the layer containing a cost-reducing filler which does not significantly reduce the effectiveness of the layer. Preferably, the filler should be halogen-free and sulphur free and should reduce the possibility of heat damage and corrosion.

Preferably, the gaskets in accordance with any of the aspects of the present invention comprise a sealing layer formed from a resilient material which comprises particles of chemically exfoliated vermiculite bonded together, the layer being at least 200 microns in thickness, wherein the layer also comprises 1–90% by weight of a plate-like filler.

Accordingly, in accordance with a fifth aspect of the present invention there is provided a gasket comprising a sealing layer formed from a resilient material which comprises particles of chemically-exfoliated vermiculite bonded together, the layer being at least 200 microns in thickness, wherein the layer also comprises 1–90% by weight of a plate-like filler.

The sealing layer of the fifth aspect may be in accordance with any of aspects of the invention defined herein or any of the preferred features thereof.

In a gasket according to any aspect of the invention, it is found that the particles of the plate-like filler tend to orientate themselves into the plane of the layer and act like a large number of tiny leaf springs, thereby improving sealing.

In accordance with any aspect of the present invention the plate-lite filler may be selected from the group consisting of talc, molybdenum disulphide, hexagonal boron nitride, soapstone, pyrophyllite, milled thermally exfoliated vermiculite, mica, fluoromica, powdered graphite, glass flake, metal flake, ceramic flake, or kaolinites.

In general, a plate-like filler has an average width of plates of at least three times the average thickness.

In a gasket according to the fifth aspect of the invention, the layer may comprise 5–80%, eg 40–60%, by weight of the plate-like filler.

One of the desirable properties of a gasket is high stress retention and it has been assumed that the way to achieve high stress retention in a gasket with a sealing layer formed from CEV is to compress the layer to consolidate it to approaching the theoretical density of CEV. Thus, such sealing layers have previously been formed with a density of 2.0 to 2.4 g/cm$^3$. However, such gaskets, although they have low gas permeability, exhibit undesirably low stress retention.

It is a still further object of the present invention to provide a gasket comprising a sealing layer based on CEV which has improved stress retention, while retaining low gas permeability.

Preferably, the sealing layer of any of the aspects of the present invention has a density in an uncompressed state of less than 1.6 g/cm$^3$.

Accordingly, according to a sixth aspect of the present invention there is provided a gasket comprising a sealing layer formed from a resilient material which comprises particles of chemically-exfoliated vermiculite bonded together, wherein the sealing layer has a density, in an uncompressed state, of less than 1.6 g/cm$^3$.

In a gasket according to any aspect of the invention, in which the density of the sealing layer is much lower than is conventional, it is surprisingly found that stress retention is greatly increased while low gas permeability is also present.

In a gasket according to any aspect of the invention, the sealing layer may have a density, in an uncompressed state, of less than 1.4 g/cm$^3$, for example the density may be between 0.8 and 1.4 g/cm$^3$.

The sealing layer of the sixth aspect may be in accordance with any of the aspects of the invention defined herein or the preferred features thereof.

It is a still further object of any aspect of the present invention to provide a gasket comprising a sealing layer based on exfoliated vermiculite, which layer comprises a polymeric binder, the layer providing improved sealing at temperatures at which the binder degrades.

Preferably, the sealing layer of any aspect of the present invention also comprises an intumescent material selected so that it expands at temperatures at which said hydrolysis resistant polymer degrades.

Thus, according to a seventh aspect of the present invention there is provided a gasket comprising a sealing layer formed from a resilient material which comprises exfoliated vermiculite, and a polymeric binder, wherein the layer also comprises an intumescent material selected so that it expands at temperatures at which said binder degrades.

The sealing layer of the seventh aspect may be in accordance with any of the aspects of the invention defined herein or any of the preferred features thereof.

In a gasket according to the invention, at temperatures which cause the binder to degrade, the intumescent material expands to at least partially fill the void left by the binder, thereby helping to maintain sealing.

Preferably, the intumescent material is unexfoliated vermiculite because, after exfoliation, it has good heat resistance. Another possibility, is to use partially exfoliated vermiculite, ie vermiculite which has been exfoliated at a lower temperature than is normally required to fully exfoliate it. The unexfoliated or partially exfoliated vermiculite may be treated (by methods which are known per se) to reduce the temperature at which exfoliation occurs, eg the temperature can be reduced to as low as 160° C. Other possible intumescent materials include expandable graphite, sodium silicate, and perlite.

The intumescent material may form up to 50% by weight of the layer but up to 20% is preferred.

There now follows a detailed description of illustrative examples according to the different aspects of the invention.

Tanged stainless steel sheet was first prepared. This sheet was 100 μm in thickness. The sheet was tanged by perforating it with square holes, each hole being 1.5 mm square and the hole centre-spacing being 3 mm. Half the holes were perforated by passing a tool through the sheet in a first direction and the remaining half, which alternated with the first-mentioned half, were perforated by passing a tool through the sheet in the opposite direction. The edges of the holes, thus, formed tangs projecting from the sheet in opposite directions. The tangs projected by about 1 mm.

The manufacture of laboratory samples was achieved using methods representative of the techniques available in a factory involved in the production of gasket materials.

Mixing of the vermiculite dough was carried out in the following manner.

Various forms of readily available mixers have been found to be satisfactory in the preparation of the required dough. Typical examples are Z blade mixers, Hobart type mixers and, for small scale mixers, Kenwood Chef type mixers.

About half of the dry vermiculite was added to the pan of whatever mixer was to be used and to it was added all the CEV dispersion. This was then mixed for three minutes and the rest of the dry material was added to the pan and the mixing continued for a further five minutes. If a silane coupling agent was being used it was then added and mixing continued for a further three minutes. At this time the rubber was added to the mix as a solution in toluene, made as indicated below, and the mixing was continued for a further five minutes after which the dough was removed from the mixer and stored in a plastic bag.

The CEV used was W R Grace's HTS dispersion which is approximately 15% solids. The dry CEV used was W R Grace's "Microlite Powder". The rubber used in these examples was either nitrile rubber N36C80 from Zeon or silicone SR224 from General Electric. The silane used was vinyl silane—the preferred coupling agents are vinylalkoxysilane such as "Silquest A151" from OSi specialities.

The aluminate examples were modified in accordance with GB 2 217 742 and for these a post sheet making immersion was sometimes used to add polymer to the mix which otherwise contained none.

The silane was added to the stated weight of the total vermiculite solids.

Unless otherwise stated the dough mixed was formed on to a core of tanged stainless steel of 0.1 m thickness.

The forming on to the core carried out by a simple calendering operation but other techniques such as spreading and pultrusion could be used.

Materials were dried at a temperature in the range of about 80 to 120° C. and then cured at the temperature appropriate for the cure system disclosed.

The NBR rubber solution was made as given in Example 1 below.

EXAMPLE 1

An aqueous slurry (15% solids) was obtained containing about 0.741 kg of CEV particles (the slurry was obtained from Grace Construction Products and is designated "Microlite HTS"). The slurry was approximately 15% solids. To this slurry was added 0.074 kg of particles of dried CEV having particle size about 45 µm obtained from Grace Construction Products Limited and designated "Micolite Powder". To this, was added 0.185 kg of Dupre Superfine TEV. This gave a paste having approximately 37% solids. To this paste was added 3.7 g of a coupling agent (a vinyl functional silane called "Silquest A-151" obtainable from OSi Specialities) and further mixing was carried out.

Next, a hydrolysis-resistant polymer/solvent mixture was prepared. This mixture was 50 g of solid nitrile butadiene rubber (Nippon Zeon N36C80), 250 g of toluene, and 3.1 g of a curing agent ("Dicup 40", dicumylperoxide). 111 g of this mixture (ie 18.5 g of rubber) was added to the above-mentioned paste and mixing was carried out. This gave a paste with approximately 5% rubber content.

Next, the paste (including the polymer/solvent mixture) was spread over one side of the metal sheet mentioned above. The sheet was then passed between calendering rollers (using release paper to prevent the paste sticking to the rollers) and was dried. Further paste was then spread over the other side of the metal sheet and the calendering and drying was repeated. The sheet was then pressed to densify the resilient material which formed layers approximately 0.75 mm thick on both sides of the metal. Then it was heated to peroxide cure the rubber at 180° C. for 15 minutes.

The completed gasket had two sealing layers formed from a resilient material. The resilient material comprised particles of CEV bonded together, and coupled to the nitrile butadiene rubber by the silane. The gasket was tested to determine its water resistance by boiling in water for 5 hours. The gasket retained its integrity.

EXAMPLE 2

An aqueous slurry (15% solids was obtained containing about 0.471 Kg of CEV particles (the slurry was obtained from Grace Construction Products Limited and is designated "Microlite HTS"). The slurry was approximately 15% solids. To this slurry was added 0.529 Kg of particles of dried CEV having particle size about 45 µm obtained from Grave Construction Products Limited and designated "Microlite Powder". This gave a paste having approximately 60% solids. To this paste was added 6 g of a coupling agent (a vinyl functional silane called "Silquest A-151" obtainable from OSi Specialities) and further mixing was carried out.

Next, a rubber/solvent mixture was prepared. This mixture was 50 g of solid nitrile butadiene rubber (Nippon Zeon N36C80), 250 g of toluene, and 3.1 g of a curing agent ("Dicup 40", dicumylperoxide). 90.9 g of this mixture was added to the above-mentioned paste and mixing was carried out. This gave a paste with approximately 2.5% rubber content.

Next, the paste (including the rubber/solvent mixture) was spread over one side of the metal sheet mentioned above. The sheet was then passed between calendering rollers (using release paper to prevent the paste from sticking to the rollers) and was dried. Further paste was then spread over the other side of the metal sheet and the calendering and drying was prepared. The sheet was then pressed to densify the resilient material which formed layers approximately 1.4 mm thick on both sides of the metal. It was then heated to peroxide cure the rubber at 180° C. for 15 minutes.

The metal sheet was then slit into strips 7 mm wide on a conventional slitting machine and these strips, thereby forming a metal carrier strip with resilient layers bonded to both sides thereof. The strips were wound into a spiral gasket by a conventional winding machine. The completed gasket had a spiral of stainless steel strip, acting as a supporting strip of the gasket, with two resilient layers between adjacent coils of the steel.

The gasket made according to the illustrative method was heated to 450° C. and held at that temperature for 8 hours. After returning to ambient temperature, the gasket was subjected to a standard pressure test and no leakage was observed.

EXAMPLE 3

The aqueous slurry was prepared in accordance with example 1 above except that only 0.166 kg of Duprey Superfine TEV was added. To this was added 19 g unexfoliated vermiculite. ie intumescent vermiculite. This gave a paste having approximately 37% solids. To this paste was added 4 g of a coupling agent (a vinyl functional silane called "Silquest A-151" obtainable from OSi Specialities) and a further mixing was carried out.

The hydrolysis-resistant polymer/solvent mixture was prepared as per example 1. The layers contained approximately 5% by weight of intumescent vermiculite.

The completed gasket of the first illustrated example had two sealing layers formed from a resilient material. The resilient material comprised particles of CEV bonded together, and coupled to the nitrile butadiene rubber by the silane. The material also comprised particles of intumescent unexfoliated vermiculite. The gasket was tested to determine its water resistance by boiling in water for 5 hours. The gasket retained its integrity. The gasket was also tested at 450° C. (a temperature which would be expected to de-grade the rubber and allow leakage) and no leakage was observed.

EXAMPLE 4

The third example was repeated except that the TEV added to the slurry was omitted and replaced by further unexfoliated vermiculite, ie 0.185 kg of unexfoliated vermiculite was added. This gave layers in the gasket containing 47.0% by weight of intumescent unexfoliated vermiculite.

EXAMPLE 5

The third example was repeated except that 0.181 kg of TEV was added (instead of 0.166 kg) and 4 g of unexfoliated vermiculite was added (instead of 19 g). This gave layers containing 1.1% by weight of intumescent unexfoliated vermiculite.

EXAMPLE 6

An aqueous slurry (15% solids) was obtained containing about 0.741 kg of CEV particles (the slurry was obtained from Grace Construction Products and is designated "Microlite HTS"). To this slurry was added 0.074 kg of particles of dried CEV having particle size about 45 microns obtained from Grace Construction Products and designated "Microlite Powder". To this, was added 0.148 kg of Dupre Superfine TEV. To this was added 37 g of Molybdenum disulphide (99%<2 μm powder, ex Aldrich Chemicals). This gave a paste having approximately 37% solids. The mineral content of the paste was 50% CEV and 40% TEV. To this paste was added 3.7 g of a coupling agent (a vinyl functional silane called "Silquest A-151" obtainable from OSi Specialities) and further mixing was carried out.

The hydrolysis-resistant polymer was prepared in accordance with example 1 and similarly the spreading calendering, and drying was repeated as described in example 1.

The completed gasket had two sealing layers formed from a resilient material. The resilient material comprised particles of CEV bonded together, and coupled to the nitrile butadiene rubber by the silane. The gasket was tested to determine its water resistance by boiling in water for 5 hours. The gasket retained its integrity.

EXAMPLE 7

Example 6 was repeated except that 37 g of talc (ex Norwegian Talc (UK) Ltd, trade IT300) was added instead of the molybdenum disulphide.

EXAMPLE 8

Example 6 was repeated except that 37 g of powdered graphite (ex David Hart Ltd) was added instead of molybdenum disulphide.

EXAMPLE 9

Example 8 was repeated except that 185 g of powdered graphite was added, (instead of TEV) giving equal proportions of graphite and CEV.

EXAMPLE 10

Example 9 was repeated except that 185 g of mica was added instead of graphite.

EXAMPLE 11

0.659 kg of an aqueous slurry (15% solids) was obtained containing about 99 kg of CEV particles (the slurry was obtained from Grace Construction Products and is designated "Microlite HTS"). To this slurry was added 0.121 kg of particles of dried CEV having particle size about 45 μm obtained from Grace Construction Products and designated "Microlite Powder". To this, was added 0.220 kg of Dupre Superfine TEV. This gave a paste having approximately 44% solids. To this paste was added 4 g of a coupling agent (a vinyl functional silane called "Silquest A-151" obtainable from OSi Specialities) and further mixing was carried out.

The hydrolysis-resistant polymer was prepared in accordance with example 1. 132 g of this mixture (21.9 g of rubber) was added to the above mentioned paste and mixing was carried out. This gave a paste with approximately 5% rubber content in the dry sealing layer.

Next, the paste (including the polymer/solvent mixture) was spread over one side of the metal sheet mentioned above. The sheet was then passed between calendering rollers so that the thickness of the layer of paste was 2.1 mm. The paste was then dried which reduced its thickness of 1.6 mm. The same quantity of paste was then spread over the other side of the metal sheet and the calendering and drying was repeated. The layers of vermiculite were then pressed to consolidate the material to a density of 0.89 g/cm$^3$ which formed sealing layers approximately 1 mm thick on both sides of the metal sheet. Then, it was heated to peroxide cure the rubber. A gasket was then cut out from the sheet. The gasket was in the form of a ring, having an internal diameter of 55 mm and an external diameter of 75 mm.

The completed gasket obtained by the illustrative example had two sealing layers formed from a resilient material. The resilient material comprised particles of CEV bonded together, and coupled to the nitrile butadiene rubber by the silane.

The gasket obtained by the illustrative example was tested to determine its stress resolution. The gasket was placed in a test rig as described in the appendix to British Standard 7531 and stressed to 40 MPa. The gasket was heated to 300° C. over a period of 1 hour and then held at that temperature for 16 hours. The stress retention was the measured and found to be 30 MPa. The gasket obtained by the illustrative example was also found to have a low gas permeability properties (leakage of only 0.02 ml/minute in the test described in DIN 3754).

As a comparative example, example 11 was repeated except that the paste was spread on to the metal sheet to a thickness of 3.3 mm which dried to a thickness of 2.4 mm. The layers were pressed to a thickness of 1 mm giving them a density of 1.66 g/cm$^3$. The gasket obtained by the comparative example was tested by the method described above to determine its stress retention, the result being 16.4 MPa. The gasket obtained by the comparative example was also found to have acceptable gas permeability properties (leakage of 0.12 ml/minute in the DIN test).

| | | | |
|---|---|---|---|
| Example 12 | 98% vermiculite (comprising 50% CEV and 50% TEV | 1% silicone resin (SR 224 available from GE) | 1% vinyl alkoxy silane (Silquest A-151) |
| Example 13 | 89% vermiculite (comprising 50% CEV and 50% TEV) | 10% silicone resin (SR 224 available from GE) | 1% vinyl alkoxy silane (Silquest A-151) |
| Example 14 | 94% vermiculite (comprising 30% CEV 20% FPSV (TEV milled) 50% TEV) | 1% coupling agent (Silquest A-151) | 5% acrylonitrile butadiene rubber (ex Zeon) |
| Example 15 | 94% vermiculite (comprising 50% | 1% coupling aqent (Silquest A-151) | 5% acrylonitrile butadiene rubber |

-continued

| | | | |
|---|---|---|---|
| | FPSV (TEV milled) 50% TEV) | | (ex Zeon) |
| Example 16 | 89% vermiculite (comprising 50% FPSV (TEV milled) 50% TEV) | 1% coupling agent (Silquest A-151) | 10% acrylonitrile butadiene rubber (ex Zeon) |
| Example 17 | 91.5% vermiculite (comprising 50% FPSV (TEV milled) 50% TEV) | 1% coupling agent (Silquest A-151) | 7.5% acrylonitrile butadiene rubber (ex Zeon) |
| Example 18 | 94% vermiculite (comprising 50% CEV 50% TEV) | 1% coupling agent (Silquest A-151) | 5% acrylonitrile butadiene rubber (ex Zeon) |
| Example 19 | 94% vermiculite (comprising 35% CEV 65% TEV) | 1% coupling aqent (Silquest A-151) | 5% silicone resin (SR 224 from GE) |
| Example 20 | 94% vermiculite (comprising 35% CEV 65% TEV) | 1% coupling agent (Silquest A-151) | 5% acroylontirle butadiene rubber (ex Zeon) |
| Example 21 | 90% vermiculite (comprising 50% CEV 50% TEV) | 5% coupling agent (Silquest A-151) | 5% silicone resin (SR 224 from GE) |
| Example 22 | 98% vermiculite (comprising 50% CEV 50% TEV | 1% coupling agent (Silquest A-151) | 1% silicone resin (SR 224 from GE) |
| Example 23 | 96% vermiculite (comprising 50% CEV 50% TEV) | 2% coupling agent (Silquest A-151) | 2% silicone resin (SR 224 from GE) |
| Example 24 | 94.5% vermiculite (comprising 50% CEV 50% TEV) | 0.5% coupling agent (Silquest A-151) | 5% silicone resin (SR 224 from GE) |
| Example 25 | 94% vermiculite (comprising 30% CEV 70% TEV) | 1% coupling agent (Silquest A-151) | 5% acrylonitrile butadiene rubber (ex Zeon) |
| Example 26 | 94% vermiculite (comprising 50% CEV 50% TEV) | 1% coupling agent (Silquest A-151) | 5% acrylonitrile butadiene rubber (ex Zeon) |
| Example 27 | 94% vermiculite (comprising 50% CEV 50% TEV) | 1% coupling agent (Silquest A-151) | 5% acrylonitrile butadiene rubber (ex Zeon) |
| Example 28 | 94% vermiculite (comprising 50% CEV 50% TEV) | 1% coupling agent (Silquest A-151) | 5% acrylonitrile butadiene rubber (ex Zeon) |
| Example 29 | 50% CEV 50% TEV | Soak in NaOH stabilised NaAlO$_2$ solution | |
| Example 30 | 50% CEV 50% TEV | Soak in NaOH stabilised NaAlO$_2$ solution | Soak in 36% solution of silicone (SR224) in toluene |

As can be seen from comparative table 1, the higher the polymer level, the lower the stress retention but the less permeable the facing and the lower the polymer level, the higher the stress retention and the higher the permeability.

Examples 14–18 make a comparison of the effect of substituting TEV for CEV in the sealing layer. The examples are shown above.

As can be seen from a comparison of example 18 and example 14 the replacement of CEV with FPSV results in an increase in the permeability of the sealing layer which is undesirable.

As can be seen from table 4, the change in the level of silane has little effect on gas permeability but does cause a loss in stress retention at levels as high as 5% compared with a level of 0.5%.

As can be further seen from table 4, Example 22 and Example 23 both show improved stress retention owing to the lower levels of silicone elastomer used in the formulation. The highest stress retention is shown by Example 22 which has a lower level of both rubber and silane compared with Example 23.

A conversion of the core types in table 5 shows that the tanged metal core has reduced gas permeability compared to the glass tissue and woven wire gauze when the latter are not initially treated with suitable filler body.

Examples 29 and 30 demonstrate the aluminate route of waterproofing described in GB 2217742 (and EP 0339343). The examples were manufactured using the materials used in previous examples.

Example 30 differs from Example 29 in that the sample has been soaked in silicone elastomer (SR224 ex GE silicones). Without the silicone elastomer soak the material was brittle and very difficult to cut into gaskets as well as having poor gas sealing properties.

The aluminate waterproofing was carried out after the consolidation stage. The sheet was soaked in a sodium hydroxide stabilised sodium aluminate solution (82 g sodium aluminate, 14 g sodium hydroxide in a liter of water) for 30 minutes. It was then rinsed in water and dried, a subsequent soak (15 minutes) in silicone solution (18% resin in toluene) was also employed to reduce friability and improve sealing.

In the above examples it is clear that only relatively low levels of hydrolysis resistant polymer are required with higher levels of CEV. This surprisingly prevents reduction in stress retention whilst also surprisingly maintaining low permeability and hydrolysis resistance in the sealing layer.

TABLE 1

| | Example 12 | Example 13 |
|---|---|---|
| Thickness t mm | 2.20 | 1.635 |
| Facing density gm/cm$^3$ | 1.69 | 1.82 |
| ASTM compression % | — | 18.6 |
| ASTM recovery % | — | 10 |
| BS Stress Retention MPa | 26.6 | 8.8 |
| DIN Gas Leakage mL/min | 2.0 | 0.02 |

TABLE 2

| | Example 14 | Example 15 | Example 16 | Example 17 | Example 18 |
|---|---|---|---|---|---|
| Thickness mm | 2.42 | 2.55 | 2.59 | 2.66 | 2.35 |
| Facing density gm/cm$^3$ | 1.68 | 1.28 | 1.09 | 1.04 | 1.71 |
| ASTM K% | 24.9 | 27.8 | 35.0 | 47.3 | 22.8 |
| ASTM rec % | 14 | 20 | 15 | 7.5 | 16 |
| BS S/R MPa | 18.0 | 20.6 | 18.2 | 18.8 | 13.3 |
| DIN G/L mL/min | 2.1 | >20 | >20 | 0.03 | 0.2 |

TABLE 3

|  | Example 19 | Example 20 |
| --- | --- | --- |
| Thickness mm | 1.46 | 1.35 |
| Facing Density gm/cm³ | 1.76 | 1.66 |
| ASTM Compression % | 15.2 | 21.3 |
| ASTM Recovery % | 20 | 10 |
| BS Stress Retention MPa | 21.1 | 27.6 |
| DIN G/L mL/min | 0.0006 | 0.01 |

TABLE 4

|  | Example 21 | Example 22 | Example 23 | Example 24 |
| --- | --- | --- | --- | --- |
| Thickness mm | 1.89 | 1.40 | 1.50 | 1.52 |
| Facing Density gm/cm³ | 1.89 | 2.05 | 1.98 | — |
| BS S/R MPa | 12.6 | 27.7 | 19.9 | 7.6 |
| DIN G/L mL/min | 0.07 | 0.02 | 0.22 | 0.09 |

TABLE 5

|  | Example 25 | Example 26 | Example 27 | Example 28 |
| --- | --- | --- | --- | --- |
| Thickness mm | 2.3 | 2.2 | 1.75 | 2.3 |
| Facing Density gm/cm³ | 1.42 | 1.16 | 1.51 | 1.42 |
| ASTM compression % | 26.4 | 38.5 | 30.9 | 19.4 |
| ASTM rec % | 15 | 12 | 11 | 26 |
| BS S/R MPa | 19.2 | 25.7 | 24.5 | 22.0 |
| DIN G/L mL/min | >20 | 0.21 | >20 | >20 |
| Core types | woven wire gauze | tanged metal | Glass tissue | woven wire gauze |

TABLE 6

|  | Example 29 | Example 30 |
| --- | --- | --- |
| Thickness mm | 2.0 | 2.0 |
| Facing Density gm/cm³ | 1.8 | 1.8 |
| ASTM compression % | N/A | 29.5 |
| ASTM rec % | N/A | 11 |
| BS S/R MPa | N/A | 21.7 |
| DIN G/L mL/min | >20 | 9.1 |

The reader's attention is directed to all papers and documents which are filed concurrently with or previous to this specification in connection with this application and which are open to public inspection with this specification, and the contents of all such papers and documents are incorporated herein by reference.

All of these features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed in one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A gasket comprising a sealing layer and a support layer the sealing layer being formed from a resilient material which comprises a chemically exfoliated vermiculite (CEV) component in a proportion of at least 25% w/w of the sealing layer, said CEV component being at least partially derived from dry CEV, and a hydrolysis resistant polymer to improve the water resistance of said sealing layer wherein the proportion of said polymer does not exceed 20% of the sealing layer, and wherein said chemically exfoliated vermiculite component includes sufficient dry CEV to provide a wet sealing layer dough with a reduced water content which is capable of being dried before substantial skinning has occurred.

2. A gasket comprising a sealing layer and a support layer the sealing layer being formed from a resilient material which comprises a chemically exfoliated vermiculite (CEV) component in a proportion of at least 25% w/w of the sealing layer, said CEV component being at least partially derived from dry CEV, and a hydrolysis resistant polymer to improve the water resistance of said sealing layer wherein the proportion of said polymer does not exceed 20% of the sealing layer, wherein the level of CEV is within the range of 25% to 80% w/w of said sealing layer, and wherein said chemically exfoliated vermiculite component includes sufficient dry CEV to provide a wet sealing layer dough with a reduced water content which is capable of being dried before substantial skinning has occurred.

3. A gasket comprising a sealing layer and a support layer the sealing layer being formed from a resilient material which comprises a chemically exfoliated vermiculite (CEV) component in a proportion of at least 25% w/w of the sealing layer, said CEV component being at least partially derived from dry CEV, and a hydrolysis resistant polymer to improve the water resistance of said sealing layer wherein the proportion of said polymer does not exceed 20% of the sealing layer, wherein the proportion of said polymer is less than 15% w/w of said sealing layer, and wherein said chemically exfoliated vermiculite component includes sufficient dry CEV to provide a wet sealing layer dough with a reduced water content which is capable of being dried before substantial skinning has occurred.

4. A gasket comprising a sealing layer and a support layer the sealing layer being formed from a resilient material which comprises a chemically exfoliated vermiculite (CEV) component in a proportion of at least 25% w/w of the sealing layer, said CEV component being at least partially derived from dry CEV, and a hydrolysis resistant polymer to improve the water resistance of said sealing layer wherein the proportion of said polymer does not exceed 20% of the sealing layer, wherein the level of CEV is within the range of 25% to 80% w/w of said sealing layer, wherein the proportion of said polymer is less than 15% w/w of said sealing layer, and wherein said chemically exfoliated vermiculite component includes sufficient dry CEV to provide a wet sealing layer dough with a reduced water content which is capable of being dried before substantial skinning has occurred.

5. The gasket of claim 1, a gasket comprising a sealing layer and a support layer the sealing layer being formed from a resilient material which comprises a chemically exfoliated vermiculite (CEV) component in a proportion of at least 25% w/w of the sealing layer, said CEV component being at least partially derived from dry CEV, and a hydrolysis resistant polymer to improve the water resistance of said sealing layer wherein the proportion of said polymer does not exceed 20% of the sealing layer wherein said chemically exfoliated vermiculite component includes sufficient dry CEV to provide a wet sealing layer dough with a reduced water content which is capable of being dried before substantial skinning has occurred, wherein a suitable hydrolysis resistant polymer is selected from: nitrile butadiene rubbers, styrene butadiene rubbers, natural rubber, butyl rubber, siloxanes and ethylene-propyldiene polymers or other diene based polymers.

6. The gasket of claim 1, a gasket comprising a sealing layer and a support layer the sealing layer being formed from a resilient material which comprises a chemically exfoliated vermiculite (CEV) component in a proportion of at least 25% w/w of the sealing layer, said CEV component being at least partially derived from dry CEV, and a hydrolysis resistant polymer to improve the water resistance of said sealing layer wherein the proportion of said polymer does not exceed 20% of the sealing layer wherein said chemically exfoliated vermiculite component includes sufficient dry CEV to provide a wet sealing layer dough with a reduced water content which is capable of being dried before substantial skinning has occurred, wherein said sealing layer is water resistant to the extent that it can withstand submersion in boiling water for a period in excess of two hours.

7. The gasket of claim 1, a gasket comprising a sealing layer and a support layer the sealing layer being formed from a resilient material which comprises a chemically exfoliated vermiculite (CEV) component in a proportion of at least 25% w/w of the sealing layer, said CEV component being at least partially derived from dry CEV, and a hydrolysis resistant polymer to improve the water resistance of said sealing layer wherein the proportion of said polymer does not exceed 20% of the sealing layer wherein said chemically exfoliated vermiculite component includes sufficient dry CEV to provide a wet sealing layer dough with a reduced water content which is capable of being dried before substantial skinning has occurred, wherein said gasket is substantially ambient water resistant for a period in excess of 20 hours.

8. A method of manufacturing a gasket comprising the steps of:
   applying a wet sealing layer dough formed from a resilient material which comprises a chemically exfoliated vermiculite (CEV) component in a proportion of at least 25% w/w of said sealing layer, said CEV component being at least partially derived from dry CEV, and a hydrolysis resistant polymer wherein the proportion of said polymer does not exceed 20% w/w of said sealing layer; and
   drying said wet sealing layer dough on said support material;
   wherein the solids content of said wet sealing layer dough prior to said drying step is in the range of 30% through 80% w/w of said dough material.

9. The method of claim 8, wherein said CEV is mixed with a suitable filling agent.

10. The method of claim 8, wherein a filling agent comprises less than 75% of said sealing layer.

11. The method of claim 9, wherein said filing agent comprises less than 75% of said sealing layer.

12. The method of claim 8, wherein said wet sealing layer dough is dried within four hours per millimeter thickness of a dry sealing layer per side.

13. The method of claim 8, wherein said wet sealing layer dough is dried within four hours per millimeter thickness of a dry sealing layer per side.

14. The method of claim 8, wherein said dough is dried between 80 through 135 degrees Celsius.

15. The method of claim 9, wherein said dough is dried between 80 through 135 degrees Celsius.

16. The method of claim 12, wherein said dough is dried between 80 through 135 degrees Celsius.

17. The method of claim 8, wherein the relative ratio of non-dry CEV to dry CEV in the total CEV component is between 0.01:1 and 20:1.

18. The method of claim 9, wherein the relative ratio of non-dry CEV to dry CEV in the total CEV component is between 0.01:1 and 20:1.

19. The method of claim 12, wherein the relative ratio of non-dry CEV to dry CEV in the total CEV component is between 0.01:1 and 20:1.

20. The method of claim 17, wherein said dry CEV component is produced by a drying technique selected from the group of:
   cake drying and pulverizing;
   film drying and pulverizing;
   rotary hot air drying;
   spray drying;
   pneumatic drying;
   fluidised bed drying of partially dried solid; or
   vacuumed dried.

21. The method of claim 18, wherein said dry CEV component is produced by a drying technique selected from the group of:
   cake drying and pulverizing;
   film drying and pulverizing;
   rotary hot air drying;
   spray drying;
   pneumatic drying;
   fluidised bed drying of partially dried solid; or
   vacuumed dried.

22. The method of claim 19, wherein said dry CEV component is produced by a drying technique selected from the group of:
   cake drying and pulverizing;
   film drying and pulverizing;
   rotary hot air drying;
   spray drying;
   pneumatic drying;
   fluidised bed drying of partially dried solid; or
   vacuumed dried.

23. The method of claim 17, wherein said dry CEV has a moisture content of less than 20%.

24. The method of claim 18, wherein said dry CEV has a moisture content of less than 20%.

25. The method of claim 19, wherein said dry CEV has a moisture content of less than 20%.

26. The method of claim 8, wherein the CEV component in said wet dough comprises a mixture of dry CEV and CEV in a slurry form.

27. The method of claim 14, wherein the CEV component in said wet dough comprises a mixture of dry CEV and CEV in a slurry form.

28. The method of claim 8, wherein a hydrolysis resistant polymer is coupled to the vermiculite by a coupling agent.

29. The method of claim 10, wherein a hydrolysis resistant polymer is coupled to the vermiculite by a coupling agent.

30. The method of claim 11, wherein a hydrolysis resistant polymer is coupled to the vermiculite by a coupling agent.

* * * * *